United States Patent [19]

Witriol et al.

[11] Patent Number: 4,853,771
[45] Date of Patent: Aug. 1, 1989

[54] ROBOTIC VISION SYSTEM

[75] Inventors: Norman M. Witriol; William H. Brumage; David H. Cowling, all of Ruston, La.

[73] Assignee: The United States of America as represented by the Secretary of the Navy, Washington, D.C.

[21] Appl. No.: 179,327

[22] Filed: Apr. 8, 1988

Related U.S. Application Data

[63] Continuation-in-part of Ser. No. 883,249, Jul. 9, 1986, abandoned.

[51] Int. Cl.$^4$ .......................... H04N 7/18; H04N 7/00
[52] U.S. Cl. ........................................ 358/93; 358/101; 358/107; 901/46; 901/9; 250/461.1; 250/483.1; 250/484.1; 382/48; 235/375; 364/478; 364/513
[58] Field of Search ................. 358/93, 101, 106, 107, 358/110, 125; 901/46, 47, 9; 250/222.1, 461.1, 462.1, 463.1, 467.1, 483.1, 484.1; 235/375, 454; 364/513, 478; 382/48, 61

[56] References Cited

U.S. PATENT DOCUMENTS

| | | | |
|---|---|---|---|
| 3,873,812 | 3/1975 | Stein et al. | 358/93 |
| 4,016,450 | 4/1977 | Balekjian | 250/462.1 |
| 4,064,528 | 12/1977 | Bowerman | 358/125 |
| 4,081,214 | 3/1978 | Van Buskirk | 358/110 |
| 4,183,055 | 11/1980 | Burkhardt, Jr. et al. | 358/101 |
| 4,281,342 | 7/1981 | Ueda et al. | 358/93 |
| 4,373,804 | 2/1983 | Pryor et al. | 356/1 |
| 4,412,121 | 10/1983 | Kremer et al. | 219/124.34 |
| 4,437,114 | 3/1984 | LaRussa | 358/101 |
| 4,556,903 | 12/1985 | Blitchington et al. | 358/106 |
| 4,613,942 | 9/1986 | Chen | 364/513 |

OTHER PUBLICATIONS

"Future directions of industrial applications"; Tsuji et al; Proceedings Fourth International Joint Conference Pattern Recognition; 1978; pp. 1143-1149.
"Determining the Movement of Objects from a Sequence of Images"; Roach et al; IEEE Transaction on Pattern Analysis and Machine Intelligence; vol. PAMI-2, No. 6, pp. 554-562; Nov. 1980.
"Corresponding Process in Dynamic Scene Analysis"; Aggarwal et al; Proceedings of the IEEE, vol. 69, No. 5; pp. 572-595; May 1981.
"A Simplified Method of Providing a Robotic Vision System"; Cowling et al; Apr. 8-11, 1986, IEEE Region 5 Conference; pp. 178-182.
"A Simplified Method of Providing a Robotic Vision System"; Cowling et al; 1985; Proceedings of the National Conference on Robotic & Automated Systems; pp. 81-91.
"Machine Perception of Three-Dimensional Solids"; Roberts; 1965; Optical and Electro-Optical Information Proceeding; pp. 159-197; MIT Press.
"A Prototype Intelligent Robot that Assembles Objects from Plan Drawings"; Ejiri et al; Feb. 1972; IEEE Transaction on Computers, vol. C-21, No. 2; pp. 161-170.
"Computational Vision"; Barrow et al; Proceedings of the IEEE; vol. 69, No. 5; pp. 572-585, May 1981.
"Three Vision Algorithms for Acquiring Workpieces from Bins"; Kelly et al; Proceedings of the IEEE; vol. 71, No. 7; pp. 803-820; Jul. 1983.

*Primary Examiner*—James J. Groody
*Assistant Examiner*—John K. Peng
*Attorney, Agent, or Firm*—Thomas E. McDonnell; Andrew M. Lesniak

[57] ABSTRACT

A Robotic Vision System for real time operation based on a luminous fiduciary code located upon a robot and an object the robot is to operate on. The luminescent code, when irradiated, locate the position of the object relative to the robot thus allowing placement of the fiduciary codes, on the object and the robot, into a predetermined desired position and orientation.

27 Claims, 2 Drawing Sheets

ROBOTIC VISION SYSTEM

The U.S. Government has an unlimited non-exclusive paid-up license in this patent.

This application is a continuation-in-part application of application Ser. No. 883,249 filed 9 July 1986, now abandoned.

The present invention relates to robotic vision systems. More specifically, the present invention relates to a robotic vision system that can identify the position of objects in real time with the use of a fiduciary code.

Most current industrial robots are relatively simple devices. The robot is "trained" by having a human operator guide it through its duty cycle. The motion is recorded and the robot just replicates this motion. This is an open loop process. The robot is incapable of correcting any positional or placement errors of objects upon which it operates. The solution to this problem is to provide the robot with a sensory system to take data which it can analyze and the use the results to modify its motion, thereby providing a closed loop system. In general, the basic goal of all current industrial robot research efforts is to develop robotic systems which will enable robots to replace humans in performing monotonous and/or dangerous jobs.

Of all five senses, vision accounts for roughly 70% of the information used. On-line industrial robots do not presently have vision capabilities. They perform manufacturing operations by rote memory where the required operations are learned by moving the robot through a learning cycle. The basic requirements of a computer vision system is that it be (i) inexpensive,
(ii) provide a simple input image,
(iii) do processing in real time,
(iv) have a low error rate, and
(v) be flexible, i.e. be able to accommodate changes in products.

See John F. Jarius, "Visual Inspection Automation," *Computer*, Vol. 13, No. 5, May 1980, pp. 32–39. John Birk and P. Kelley, "Research Needed to Advance the State of Knowledge in Robotics," National Science Foundation Workshop on Robotics, April 1980, Newport, R.I., pp. 48–52. Current research efforts at providing robots with vision involve (a) using a camera to obtain an image, (b) digitizing this analog information, (c) using a computer to analyze the information via a gray scale and contrast change algorithm to obtain edges and vertices, and (d) using a matching process to identify and obtain the orientation of object. The goal is to accomplish image segmentation—namely to recognize and locate objects For example, in an industrial assembly operation the system would have to (a) identify and locate all the parts, and (b) put all the parts together correctly. The system would thus have to know the position of a robot arm in real time. The real time requirement means one which requires fast algorithms. One current method is to use a backlighted scene in which the parts are black against a white background. The disadvantages of this method are that (a) it only gives a two-dimensional image, and (b) it can only be used if the shape of the objects are significantly different. More advanced methods under investigation involve using a spatial gray level dependence method. This method has demonstrated its ability to analyze relatively complex scenes. However the algorithms used take an unreasonable amount of time on current microcomputers. In addition, they can readily be "fooled" into making false identifications. Algorithms to avoid this problem require even longer processing time requirements. Bin picking systems relying only on remote sensing have not yet been demonstrated. See R. B. Kelley, H. A. S. Martins, J. R. Birk and J. D. Dessimoz, "Three Vision Algorithms for Aquiring Workpieces from Bins," *Proceedings of the IEEE*, Vol. 71, No. 7, July 1983, pp. 803–820.

There is thus a clear need for computer vision systems which are capable of dealing with scenes which are not entirely predicted and/or structured. S. Tsuji et al., "Panel on Future Direction of Industrial Applications," Proc. Fourth Int'l Joint Conf. Pattern Recognition, 1978 pp. 1143–1149. The goal of most visual scene analysis programs is to be able to identify all the objects in a scene regardless of orientation, with parts of some objects occluded by other parts, and under varying lighting conditions. Computer programs that can barely cope with simple scenes under these conditions are huge, difficult to code or modify, time consuming and require very large computers. John F. Jarius, "Visual Inspection Automation, "*Computer*, Vol. 13, No. 5, May 1980, pp. 32–39.

Most current systems use a Vidico or CCD visual sensor, various algorithms to determine edges and corners and then by comparing to an internal model, determine the object and its orientation.

Current techniques are too slow for real time processing and have difficulty determining 3-D structure against the changing backgrounds which occur as the object moves on an assembly line. Harry G. Barrow and Jay M. Tenenbaum, "Computational Vision,"*Proceedings of the IEEE*, Vol. 69, pp. 572–595, May 1981; J. K. Aggarwal, Larry S. Davis, and Worthy N. Martin, "Correspondence Processes in Dynamic Scene Analysis," Proceedings of the IEEE, Vol. 69, No. 5, May 1981, pp. 562–572; Gerald J. Agin, "Computer Visions Systems for Industrial Inspection and Assembly," *Computer*, Vol. 13, No. 5, pp. 11–20; M. Ejiri, T. Uno, Hy Yoda, T. Goto and K. Takeyasu, "A Prototype Intelligent Robert that Assembles Objects from Plan Drawing," *IEEE Trans. Computers*, Vol. C-21, No. 2, February 1972, pp. 161–172. While the speed requirement is somewhat nebulous, it is probably convenient to place an upper limit of one second for a effective system to process one frame of image data. Anything slower than this time will have a hard time finding a place in any manufacturing application. TV cameras operate at rates on the order of 60 frames per second. Image processing that keeps up with this rate can be though of as "real time".

SUMMARY OF THE INVENTION

Accordingly one object of the present invention is to provide a novel and unique robotic vision system which is inexpensive.

Another object of the present invention is to provide a novel and unique robotic vision system that has a low error rate.

Another object of the present invention is to provide a novel and unique robotic vision system that is able to accommodate changes and variations in the products it is working upon.

These and other objects of the present invention are achieved with an apparatus for robotic vision which enables an object to be moved by a robot, whether the object is situated correctly or not, comprising, a fiduciary code which identifies the position and orientation of the object to be moved by the robot, the fiduciary code being luminescent; luminescent means for causing the fiduciary code to luminesce; sensing means for detecting the position of the fiduciary code; computing means for determining the position and orientation of any portion of the object in relation to the robot in real time by subtracting from the sensed luminescent image the sensed non-luminescent image (or vice-versa), thereby providing an image of the fiduciary code only, which can then be used as input for the computing device, thereby providing a closed loop which will enable the fiduciary code on the object and the robot to be put into a predetermined desired position and orientation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
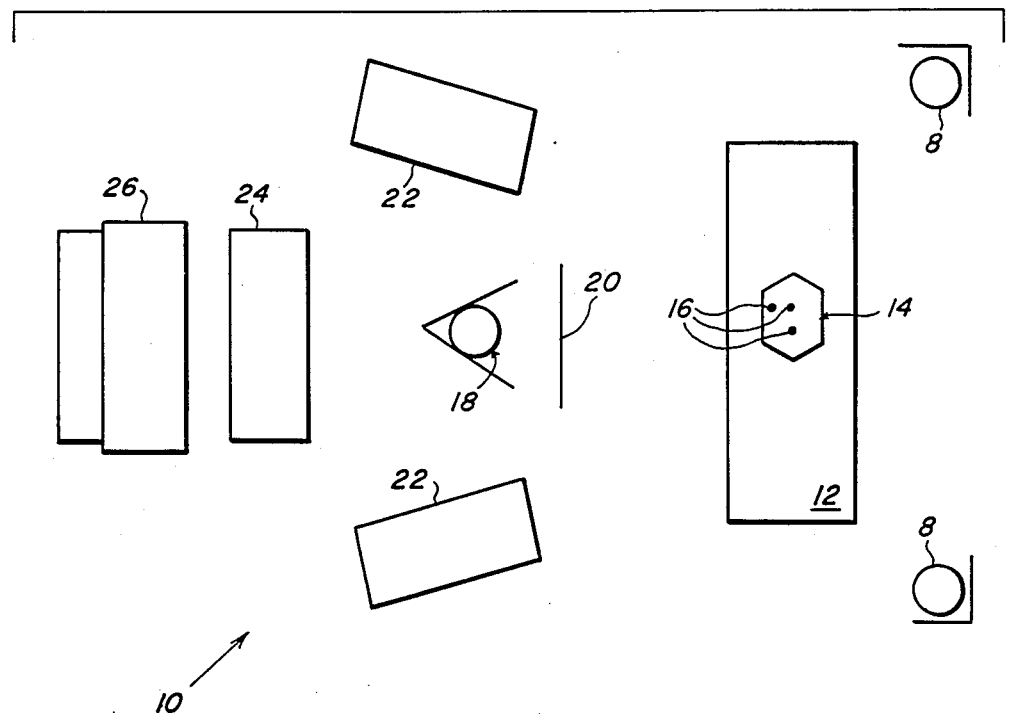
FIG. 1 is a schematic drawing of a robotic vision system.

Referring now to the drawings, wherein like reference numerals designate identical or corresponding parts throughout the several views, and more particularly to FIG. 1 thereof, there is disclosed a robotic vision system 10. The robotic vision system is comprised of a work station 12 along which an object 14 is transported. The object 14 has a luminescent fiduciary code 16 located thereon that luminesces when an ultraviolet (UV) or infrared (IR) light source 18 irradiates the fiduciary code 16 of dots. Ultraviolet light and infrared light are two forms of nonvisible luminescent light. An electrically operated shutter 20 located between the UV light and the work station 12 blocks the UV or IR light during normal work station lighting exposure intervals. Alternatively one can use a UV or IR light that can be turned on and off at will. Video cameras 22 receive the light from the scene, including that from the fiduciary code 16 and pass that information via a connection (not shown) to an interface board and flash convertor 24. The convertor 24 takes the signal from the video cameras 22 and converts it into a signal that a computer 26 can manipulate and store. A main computer 26 substracts off the image without luminescence seen by the cameras 22 from the overall image with luminescence, leaving just the fiduciary code 16 (or vice-versa).

More specifically, luminescent fiduciary coded markings or dots 16 to locate the position of components are used rather than visual edge and corner identification as is used in the prior art. An industrial processing station using the robot vision system for 3-D imaging would employ 2 videocons or CCD cameras 22. These would be used to view the work station 12 and the incoming material 14. The incoming material 14 to the work station 12 would be marked with luminescent marks 16 that would emit a frequency of light which would stand out from the work station 12 when illuminated with ultraviolet or infrared light. For certain operations wherein full 3-D imaging is not required, a single videocon may be utilized There are several ways one could use this procedure. In one method the image would first be recorded in background light. The ultraviolet or infrared light source 18 would be turned on, then off (or vice-versa). A second image would then be recorded while the light source 18 is on. By subtracting the first image from the second image one would be left with the image of just the dots. By equipping the CCD cameras or Videocons 22 with narrow band light filters (not shown) the luminescent marks would obviously stand out from the background. An alternate procedure, depending on the work environment, would consist of keeping the ultraviolet or infrared light 18 on constantly, using narrow band light filters for the luminescent dyes chosen and having the CCD cameras or Videocons 22 look for the fluorescent marks 14. In either case the position of the marks would be stored in the memory of the host computer 26 at specific memory array locations corresponding to the pixel location from the camera equipment 22. Two cameras 22 would be used to develop three dimensional imaging ability. The stored pixels from the video equipment 22 can then be used as input data to algorithms which would find the exact location and orientation of the material 14 at the work station 12.

This method provides "real time" analysis of motion since it is only necessary to determine the motion of these easily observed luminescent fiduciary marks 16. For example, by observing the position of three marks not on a line, there would be an overly determined set of equations for determining the position of the object 14. The problem of determining the position of objects from the motion of points has been well studied See J. W. Roach and J. K. Aggarwal, "Determining the Movement of Objects from a Sequence of Images," *IEEE Trans. Pattern Anal. and Machine Intell.*, Vol. PAMI-2, No. 6, November 1980, pp. 554–562; Re L. G. Roberts, "Machine Perception of Three-Dimensional Solids," in *Computer Methods in Image Analysis*, J. K. Aggarwal. R. 0. Duda, and A. Rosenfeld, Eds New Turk: IEEE press, 1977, pp. 285–323. It should also be noted that there is no problem with changing shadows due to changing lighting and viewing conditions.

FIG. 1 shows a work station 12 along with the video equipment 22 and associated computer 26. The system operates in real time because of the reduced computational work load that results from the method of finding the location of the work material 14 directly. The method, applied to the three dimensional case eliminates the need of two simultaneously processed algorithms to find edges and corners, and the correspondence problem. The gray scale to the video equipment 22 is used to control the contrast of the background, and is handled by the computer. To find the pixels in memory it is then only necessary to search the memory array looking for high contrast memory locations.

There appears to be two fairly straight forward ways of achieving image location and orientation by using codes which luminesce due to ultra-violet or infrared illumination. The first is to simply use color filters and set the gray scales of the video or CCD camera 22 to a level at which fiduciary marks will exhibit an extremely high level or contrast. A high speed search of computer memory can pick up these fiduciary marks. While this method seems simple it does place some restriction on the luminescent dyes and on the background lighting A second method involves pulsing the ultra-violet or infrared source and reading the scene twice; (a) during, or (b) shortly thereafter and at several luminescent decay times later between each pulse. The two readings as stored in memory would be different, and the main scene times should then cancel out, leaving the luminescing codes at very high contrast The luminescence of the codes decays with time, and therefore the technique of comparing the memory for the two separate readings taken at two different times from the excitation pulse provides the required high contrast information. For example, the object and robot could be irradiated for no more than 1 second.

Because of the video equipment 22 setup there would be a one-to-one correspondence between these memory locations and material 14 location and orientation at the work station 12. The location of specific surface features upon which an industrial operation is to be performed would be stored in memory relative to the marking codes. Thus, the robot will be able to find the location and the orientation of the object, and using this information would be able to perform the desired industrial operation.

The camera 22 position and orientation form the reference upon which measurements of the work material are made and therefore need to be carefully controlled. If the work station 12 itself was also arranged with fiduciary marks in the same manner as the work material 14, then all measurements could be made with respect to the work station 14, and the requirements on camera 22 position and orientation could be reduced.

Figure 2:
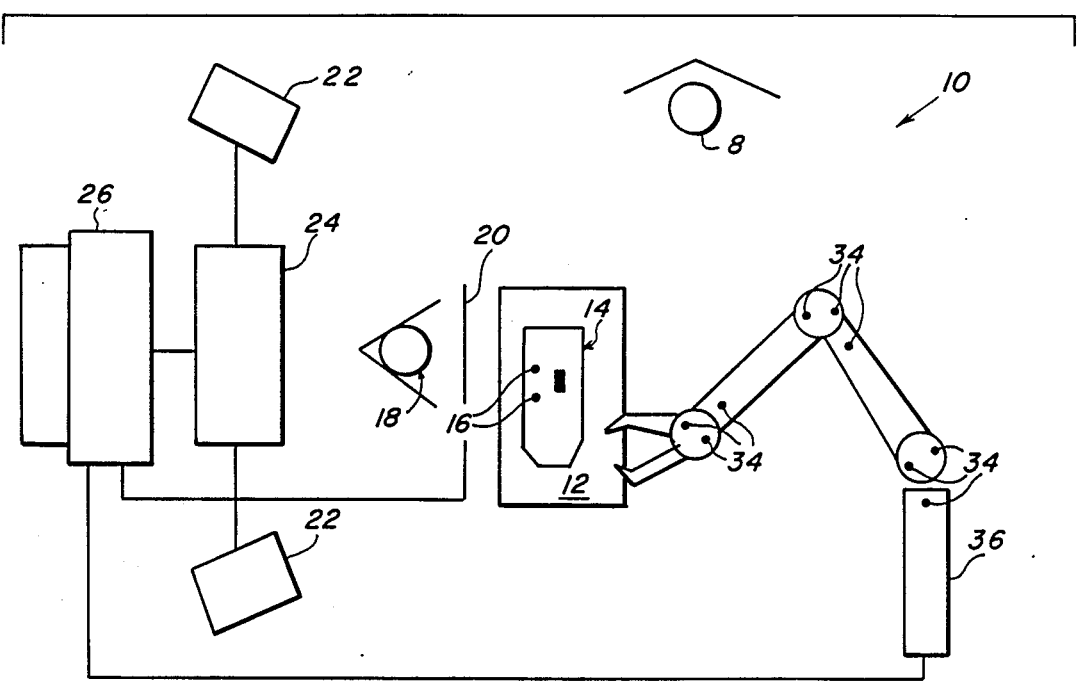
FIG. 2 is a schematic drawing of a robotic vision system with a robot arm.

FIG. 2 shows a second feature that is also present. Fiduciary codes 34 could be used to mark a robot 36. These codes could be chosen to exhibit a different spectrum, from that of the material at the work station, when illuminated by ultra-violet or infrared light source 18. This pixel information would then be used for final feedback information to position the robot itself for the preprogramed industrial operation. This method, by providing a closed loop, should serve to increase the allowed accuracy of the robotic system. In both FIGS. 1 and 2 the information coming in from the video equipment 22 can be displayed as the location of the robot and the material to be processed with respect to some reference point. As is well known, See R. A. Jaris, "A Perspective on Range Finding Techniques for Computer Vision," *IEEE Trans Pattern Anal. Machine Intell No. 1, PAMI-5, No. 2, March* 1983, pp. 122–139 the farther apart the two camera positions are, the potentially more accurate are the depth calculations, but the more prevalent is the missing parts problem and the smaller is the field of view overlap. Since fiduciary marks are being looked for, since there could be several fiduciary marks per item, and since the position of all the fiduciary marks and their relationships to each other are known by the computer, the proposed technique is less sensitive to this type of problem than the alternate procedures. As an example, the optimum separation will probably depend on the distance of the cameras from the object, and the task to be performed.

The advantages of the present technique are numerous First, it could be readily applied to assembly operations. Such operations as mounting wheels or assembling doors on vehicles seem to be tailor-made for this method. Different parts could be identified by different colored fluorescent fiduciary marks. Color identification could easily be incorporated into the visual system. Different fiduciary marks, dot codings, sizes, shapes and/or colors could then be used to determine orientation.

For example, three marks, not in a line, perceived by two different cameras, coupled with the knowledge of the location of these marks on an object (stored in computer memory) will enable one to obtain the location and orientation of a specific part. Similar fiduciary marks placed on the robotic arm could be used to give its position and orientation. With this information relatively straightforward algorithms could be developed for specific application, incorporating real-time feedback of arm motion object position.

Secondly, the method could be used in visual inspection applications. The fiduciary marks would be used to determine the orientation of the part to be checked. The part could then be obtained by the robot arm, oriented to a specific orientation, could proceed.

Thirdly, the method could be used to provide a passive system for mobile robots, or smart wheelchairs to identify passageways, doorways, shelves, etc. Namely by painting specific fiduciary marks on these stationary items, and using the mobile unit to illuminate them in a similar manner as described, they could be readily identified. For example, a mobile robot would "know" exactly where it was, and from a map stored in computer memory, compute how it has to move to reach a programmed location. This procedure would enable general purpose robots to locate specific doors, passageways, etc. A mobile robot of this type would be very useful in nuclear or chemical plants where one would want to test chambers for potentially dangerous contamination. In order for the method just described to locate a test object the system must be able to visually determine the Cartesian coordinates of this test object in a system measured from an arbitrary reference, and at the same time, find the orientation (Euler angles) of this same object. The system will use this information to position a robot hand at a presepecified location on the test object.

In an actual manufacturing operation this information on location and orientation of the subject would be used to grasp and possibly reorient a specified part.

One preferred embodiment of many possible embodiments consists of using Quantex CX-100 video cameras 22 that feed a Quantex analog board 24 which converts the video cameras 22 signal from analog to digital. The digitalized signal is then passed to a Quantex QX 9200 computer 26 that locates the position of the fiduciary codes 16 and 34 on the object 14 and the robot 36, respectively. The computer 26 then sends a signal to a Fared Motoman L10 Robot 36 causing the fiduciary codes on the object 14 and robot 36 to be put into a pre-determined desired position and orientation in real time. Normal lighting 38 may be used as needed in the work station 10.

Figure 3:
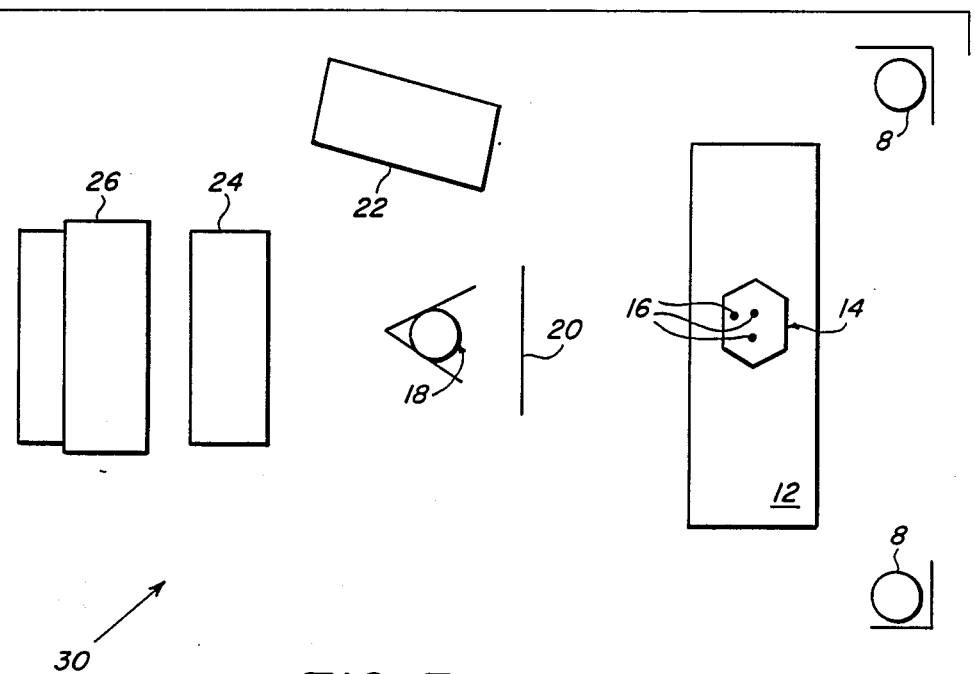
FIG. 3 is a schematic drawing of another robotic vision system.

Another robotic vision system 20 shown in FIG. 3 differs from system 10 shown in FIG. 1 is that a single video camera 22 is employed in system 20 instead of the two video cameras 22 employed in system 10 receives the light from the scene, including that from the fiduciary code 16 and passes that information via a connection (not shown) to an interface board and flash convertor 24. The convertor 24 takes the signal from a computer and converts it into a signal that a computer 26 can manipulate and store. A main computer 26 subtracts off the image without luminescence seen by the camera 22 from the overall image with luminescence, leaving just the fiduciary code 16 (or vice-versa).

Figure 4:
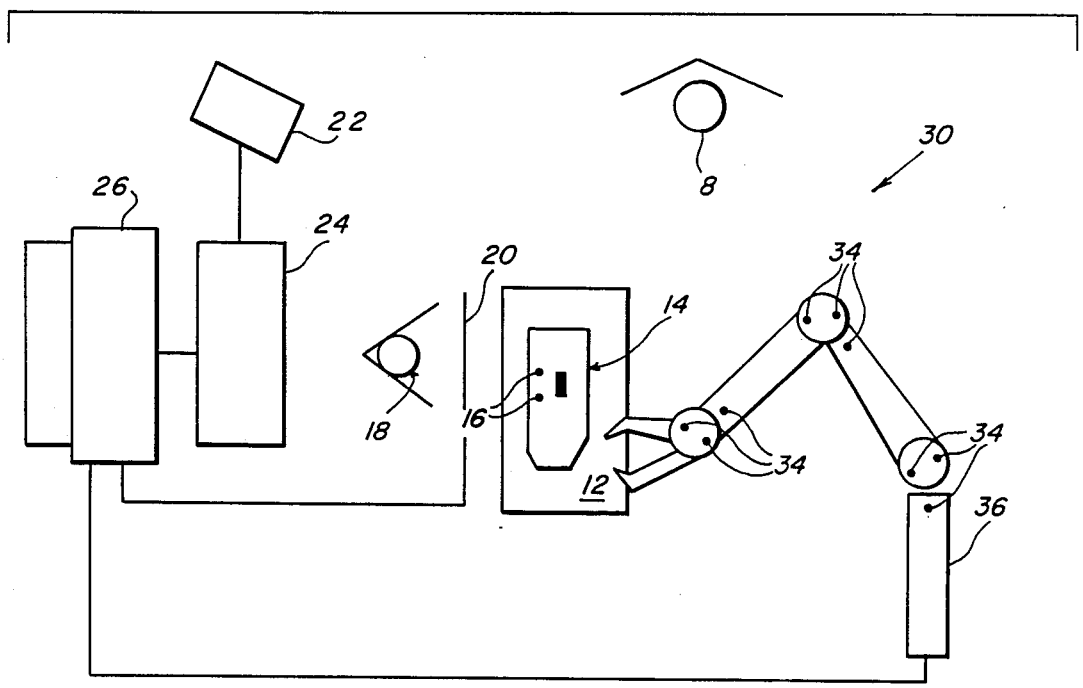
FIG. 4 is a schematic drawing of the robotic vision system shown in FIG. 3, with a robot arm.

Robotic vision system 20 (shown in FIG. 3) combined with a robot arm as shown in FIG. 4 includes fiduciary codes 34 marking a robot 36 and differs from system 10 (shown in FIG. 2) in that a single video camera 22 is employed in system 20 instead of two video cameras employed in system 10.

Obviously many modifications and variations of the present invention are possible in light of the above teachings. It is therefore to be understood that within the scope of the appended claims, the invention may be practiced otherwise than as specifically described.

What is claimed and desired to be secured by letters patent of the united states is:

1. An apparatus for robotic vision to enable an object to be located and moved by a robot, whether the object is situated correctly or not, comprising:
   a luminescent fiduciary code which identifies the position and orientation of the object to be moved by the robot, the fiduciary code being marked on the object and on the robot;
   luminescent means for causing the fiduciary code to luminesce, said luminescent means being an ultraviolet or infrared light;
   sensing means for detecting the position of the fiduciary code wherein the sensing means is a first and a second videocon aimed at the object and positioned to each receive a scene containing the object including, at times, the luminescence of the fiduciary code, said first and second videocons having a first and a second signal, respectively, which signals are representative of luminescent and non-luminescent images seen by both the first and the second videocons;
   computing means for determining the position and orientation of any portion of the object in relation to the robot in real time; and
   connection means to pass the first and second signals of the first and second videocons, respectively, to the computing means where image subtraction is performed by subtracting a luminescent image from a non-luminescent image or vice versa.

2. An apparatus as described in claim 1 wherein the computing means also converts said first and second signals from analog to digital form and forwards them to a main computer.

3. The apparatus as described in claim 1 wherein said luminescent means irradiates continuously the object marked with the luminescent fiduciary code.

4. The apparatus as described in claim 1 wherein said luminescent means irradiates noncontinuously the object marked with the luminescent fiduciary code, during two time frames separated in time.

5. A method for enabling an object to be located and moved by a robot comprising the steps of:
   irradiating continuously the object marked with a luminescent fiduciary code with ultraviolet or infrared light in accordance with said code, which causes the luminescent fiduciary code to luminesce, said luminescent fiduciary code being situated at a predetermined position on the object;
   using videocon camera means for sensing the location of the luminescent fiduciary code on the object by receiving the luminescent energy emitted by the irradiated code marked on the object to receive a scene containing the object including, at times, the luminescence of the fiduciary codes, the camera means having a first signal and having a second signal representative of a luminescent image and non-luminescent image seen by the camera means;
   computing in real time the position and orientation of the object from the location of the luminescent fiduciary code that has been sensed;
   passing the first and second signals of the camera means to a computing means; and
   using the computing means for subtracting a luminescent image from a non-luminescent image or vice versa.

6. The method of claim 5 further comprising the step of:
   passing the luminescent light through a filter before the luminescent energy from the code is recovered.

7. The method of claim 5 further comprising the step of:
   irradiating another luminescent fiduciary code located on the robot while irradiating said fiduciary code on the object so that information acquired from both the fiduciary codes can be used to enable the robot to interact with the object to move the object.

8. A method for enabling an object to be located and moved by a robot comprising the steps of:
   irradiating the object marked with a luminescent fiduciary code with ultraviolet or infrared light for a time interval thus causing the luminescent fiduciary code to luminescent during and after the time interval when the object is irradiated, the luminescence subsiding after the irradiation ceases, said fiduciary code being situated at a predetermined position on the object,
   taking a first picture of the object while the fiduciary code thereon is luminescing;
   storing the first picture in a computer memory;
   taking a second picture of the object when the luminescence of the code has subsided;
   storing the second picture in a computer memory;
   subtracting the second picture from the first picture or subtracting the first picture from the second picture so only locations in the pictures with luminescent codes are retained; and
   computing in real time the position and orientation of the object from the pre-positioned luminescent code on the object.

9. The method of claim 8 wherein the irradiating of the object marked with the fiduciary code is discontinued after storing the first picture in the computer memory.

10. The method of claim 8 wherein the irradiating of the object marked with the fiduciary code is discontinued before storing the first picture in the computer memory.

11. The method of claim 8 wherein the subtracting of pictures of the object is accomplished with two videocons acting simultaneously during two distinct time frames.

12. The method of claim 11 wherein the distinct time frames are time separated.

13. The method of claim 8 further comprising the step of:
   irradiating another luminescent fiduciary code located on the robot while irradiating said fiduciary code on the object so that information acquired from both fiduciary codes can be used to enable the robot to interact with the object to move the object.

14. The method of claim 8 wherein the irradiating of the object marked with the fiduciary code is discontinued after a finite time interval followed by a time in which luminescence of the fiduciary code subsides 15. The method of claim 14 wherein the irradiating of the object marked with the fiduciary code is discontinued after the first picture is stored in the computer memory.

16. The method of claim 14 wherein the irradiating of the object marked with the fiduciary code is discontinued before the first picture is stored in the computer memory.

17. The method of claim 14 wherein the irradiating of the object is performed noncontinuously to permit subtraction of two pictures of the luminescent code taken at two separate times.

18. A method for enabling an object to be located and moved by a robot comprising the steps of:
   irradiating with ultraviolet or infrared light the object and the robot, each of which are marked with a respective fiduciary code of luminescent markings, said fiduciary code on said object and on said robot being situated at a pre-determined position on the object and at a predetermined position on the robot;
   sensing the location of the luminescent marks on the object and on the robot by receiving the luminescent energy emitted by the irradiated luminescent markings of both the object and robot;
   computing in real time the position and orientation of the object relative to the robot from the location of the luminescent markings that have been sensed; and
   placing the luminescent markings on both the object and the robot into a pre-determined desired position and orientation.

19. The method of claim 18 wherein the irradiating of the object and the robot is performed continuously.

20. The method of claim 18 wherein the irradiating of the object and the robot is performed noncontinuously.

21. A method for enabling an object to be located and moved by a robot comprising the steps of:
   irradiating for a specific time interval both the object and the robot, each of which are marked with a luminescent fiduciary code, with ultraviolet or infrared light which causes the luminescent code to luminesce so that the luminescence from the code subsides after the irradiating of the object is discontinued, said fiduciary codes being situated at predetermined positions on the object and on the robot,
   taking a first picture of the object and the robot while the fiduciary codes are luminescing;
   storing the first picture in a computer memory;
   taking a second picture of the object and the robot after the luminescence of the fiduciary codes has subsided;
   storing the second picture in a computer memory;
   subtracting the second picture from the first picture so only locations in the pictures with luminescent codes are retained;
   computing in real time the position and orientation of the object relative to the robot from the pre-positioned luminescent codes on the object and robot; and
   placing the fiduciary code on the object and the fiduciary code on the robot into a predetermined desired position and orientation.

22. A method for enabling an object to be located and moved by a robot, comprising the steps of:
   taking a first picture of the object before a luminescent fiduciary code thereon is irradiated with ultraviolet or infrared luminescent light, said fiduciary code being situated at a predetermined position on the object;
   storing the first picture in a computer memory;
   irradiating the object marked with the luminescent fiduciary code with ultraviolet or infrared luminescent light for a time interval thus causing the luminescent fiduciary code to luminesce during and after the time interval when the object is irradiated, the luminescence subsiding after the irradiation ceases;
   taking a second picture of the object while the fiduciary code thereon is luminescing as a result of irradiating the object with the ultraviolet or infrared luminescent light as aforesaid;
   storing the second picture in a computer memory;
   subtracting the second picture from the first picture or subtracting the first picture from the second picture so only locations in the pictures with luminescent codes are retained; and
   computing in real time the position an orientation of the object from the pre-positioned luminescent code on the object.

23. A method for enabling an object to be located and moved by a robot, comprising the steps of:
   taking a first picture of the object and the robot before fiduciary codes on the object and the robot are irradiated with ultraviolet or infrared luminescent light, said fiduciary codes being situated at predetermined positions on the object and on the robot;
   storing the first picture in a computer memory;
   irradiating for a specific time interval both the object and the robot each marked with the luminescent fiduciary code as aforesaid with ultraviolet or infrared luminescent light, which causes the luminescent codes to luminesce so that the luminescence from the codes subsides after the irradiating of the object is discontinued;
   taking a second picture of the object and the robot during the luminescence of the fiduciary codes before the luminescence has subsided;
   storing the second picture in a computer memory;
   subtracting the second picture from the first picture or subtracting the first picture from the second picture so only locations in the pictures with luminescent codes are retained;
   computing in real time the position and orientation of the object relative to the robot from the pre-positioned luminescent codes on the object and robot; and
   placing the fiduciary code on the object and the fiduciary code on the robot into a predetermined desired position and orientation.

24. An apparatus for robotic vision to enable an object to be located and moved by a robot, whether the object is situated correctly or not, comprising:
   a luminescent fiduciary code which identifies the position and orientation of the object to be moved by the robot, the fiduciary code being marked on the object and on the robot;
   luminescent means in the form of ultraviolet or infrared light for causing the fiduciary code to luminesce;

videocon sensing means for detecting the position of the fiduciary code, the sensing means being aimed at the object and positioned to receive a scene containing the object including, at times, the luminescence of the fiduciary codes, said sensing means having a first and a second signal, which signals are representative of luminescent and non-luminescent images seen by the sensing means;

computing means for determining the position and orientation of any portion of the object in relation to the robot in real time; and connection means to pass the first and second signals of the sensing means to the computing means where image subtraction is performed by subtracting a luminescent image from a non-luminescent image or vice versa.

25. An apparatus as described in claim 24 wherein the videocon sensing means includes a first videocon producing the first signal and a second videocon producing the second signal and the ultraviolet or infrared light irradiates the luminescent fiduciary code.

26. An apparatus as described in claim 25 wherein the videocon sensing means is a first and a second videocon aimed at the object with each videocon positioned to receive a scene containing the object including, at times, the luminescence of the fiduciary codes, said first and second videocons having said first and said second signal, respectively, which signals are representative of luminescent and non-luminescent images seen by both the first and the second videocons.

27. An apparatus as described in claim 25 wherein the computing means also converts said first and second signals from analog to digital form and forwards them to a main computer.

* * * * *